Patented Dec. 5, 1950

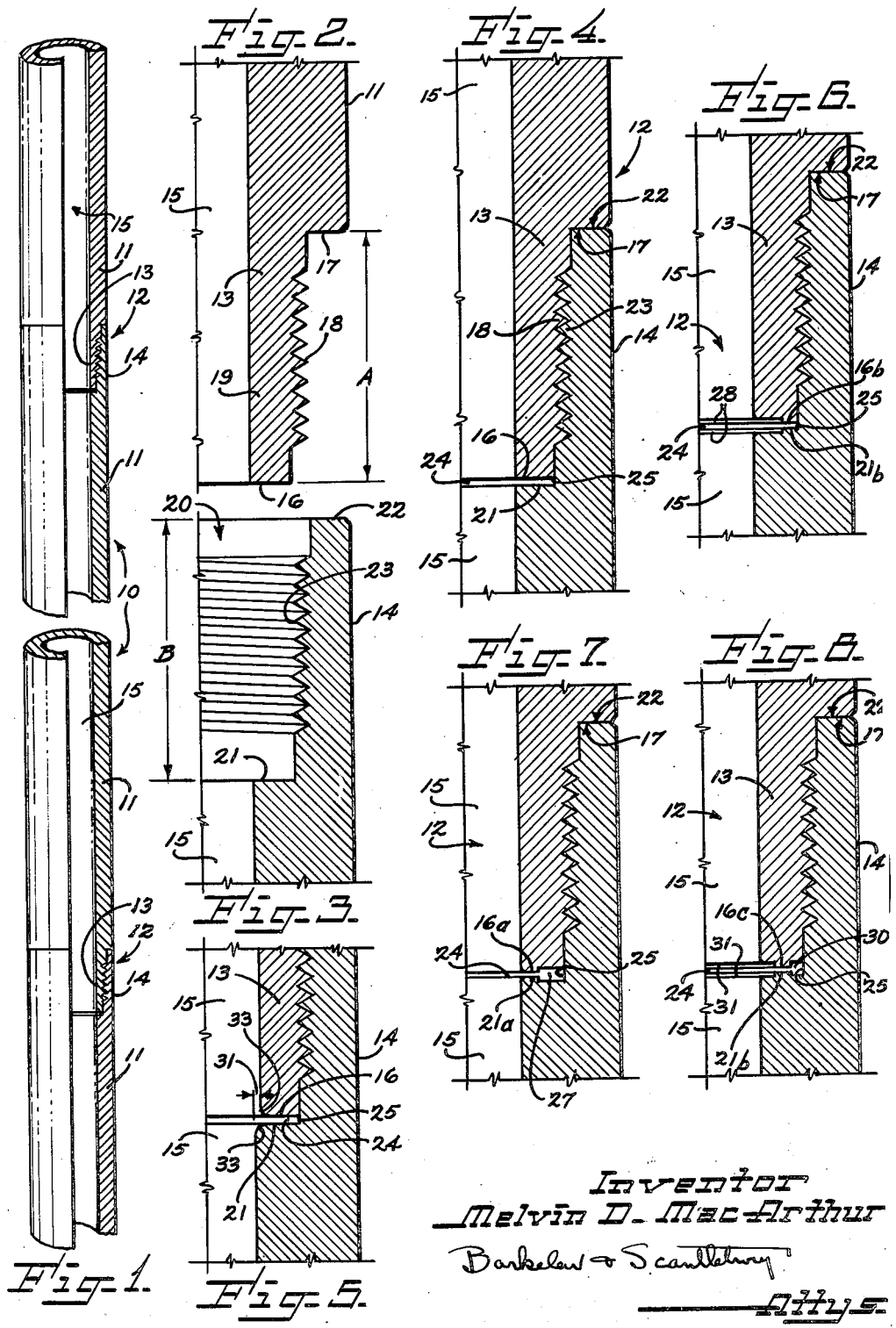

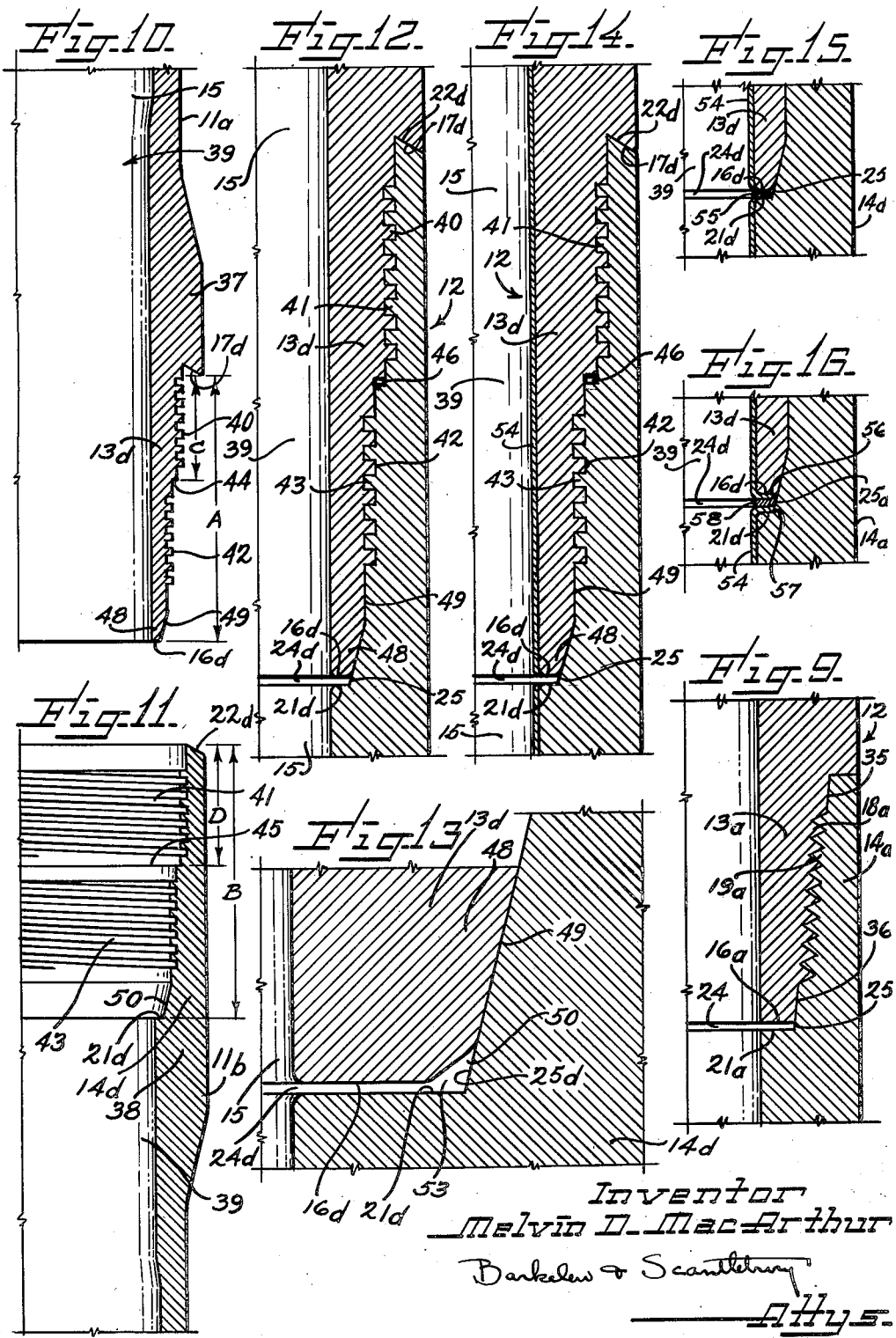

2,532,632

UNITED STATES PATENT OFFICE 2,532,632

TUBING AND TUBING JOINT

Melvin D. MacArthur, Los Angeles, Calif., assignor to Hydril Corporation, Los Angeles, Calif., a corporation of California Application October 4, 1948, Serial No. 52,675

3 Claims. (Cl. 285—146)

This invention has to do generally with pipe and pipe joints, and is more particularly concerned with tubing and tubing joints used in connection with the drilling of and production from oil wells and the like.

The main office of oil well tubing is to conduct oil or gas production from the "pay" zone to the ground surface, and it must have certain characteristics to do this with full efficiency. However, it has long been the desire to extend the functions of the tubing by its utilization, in lieu of the usual small-diameter, auxiliary drilling string (known as the "drilling-in string") for drilling through the cement immediately above the "pay." But usual tubing joints have not been adapted to such use because of their inherent characteristics, and it is therefore among the objects of my invention to provide a tubing joint which is well adapted to the use of the tubing as a "drilling-in" string.

Once the tubing is set, it is exposed to many conditions which tend to reduce its efficiency as a conductor pipe, often to the point where failure results. It is therefore also among the objects of my invention to provide tubing and tubing joints which originally have and constantly maintain a very high degree of efficiency as production conductors in spite of the special provisions whereby the tubing is rendered adaptable for use as a "drilling-in string."

In order effectively to be used as a "drilling-in string" the joints are of the "pin-and-box" type of a usual drilling string, rather than of the plain collar type of usual tubing, whereby all the advantages of "stabbing" and "tool-joint" characteristics are had. That is, the opposed ends of adjacent tubing sections are coupled by interfitting, threadably connected, pin and box members.

A first requirement for a tubing is that its joints must be leak-proof, which means there must be abutting surfaces on the joint parts which engage in fluid sealing relation. Since the string is to be exposed to torsional forces both in making up the joints and in the operation of packers or the like, it is necessary that, in their made-up condition, there be stops on the joint members which establish the extent of telescopic overlap of the pin and box members. At the time of that establishment the sealing surfaces must be in full operative engagement, and, in fact, it is preferable that the sealing surfaces, in their mutual engagement, act as such stops.

Since the tubing wall is relatively thin, the stop shoulders are necessarily restricted as to radial extent and they are therefor not well adapted to take torque overloads which may occur during drilling-in or during tubing-rotation for the operation of certain types of tools. It therefore becomes desirable to provide auxiliary stop shoulders which come into play under the forces of torque over-load before the metal of the joint is harmfully deformed or stressed. Because it is not feasible to attempt the provision of two sets of stops which engage exactly simultaneously, the shoulders of the auxiliary stop are so located that they stand slightly apart when the sealing shoulders first engage and so long as there is no torque over-load.

Since it is highly desirable that the meeting line of the sealing surfaces be exposed exteriorly of the pipe for inspection purposes, this necessarily puts the auxiliary stop shoulders within the pipe and, normally, the space between those shoulders opens to the pipe bore. If the auxiliary stop shoulders are represented by the distal end of the pin and the bottom wall of the box, the space between them opens to the pipe bore. Or, if the auxiliary stop shoulders are provided at a point spaced from the distal end of the pin and the bottom of the box, the surfaces defining said end and bottom must be spaced apart so as not to interfere with the seating of the stop and auxiliary shoulders, and hence the gap between those surfaces will open to the bore.

Thus, in either event, there will be normally an annular space opening to the pipe bore, and this space becomes a critical factor in considerations which I will now discuss.

To be ideal, the bore of the tubing string should be of uniform diameter throughout its longitudinal extent, with no interruptions in the form of protuberances or depressions. Particularly there should be no abrupt interruptions. But the usual axial spacing of joint-parts which are exposed within the tubing bore normally gives a condition which represents such an interruption. Such an interruption, in the usual joint, has the following disadvantageous effects.

In the first place, swabs which are operated through the bore are subject to severe damage as they pass the interruptions, resulting in a requirement for frequent swab-replacement. Furthermore, when swabs are used as pushers in pumping with a "free" type pump, bits of rubber, torn from the swab in passing the interruptions, interfere with the proper operation of the pump and valves.

In using a plunger lift in a gas lift pumping well, a piston is blown from the bottom of the well to the surface, the piston driving a charge of oil ahead of it. When the tubing joints present the annular recesses of usual magnitude, oil is delivered to the recesses ahead of the piston during its upstroke, and drains back into the well after the piston has passed. Since the number of joints in a long tubing string is large, the individual losses amount, in the aggregate, to an appreciable loss and pumping efficiency is correspondingly impaired. The same effect is had when, as in a "bottom hole intermitter" in a gas lift pumping well, bubbles of gas are employed to deliver charges of oil to the surface.

An "interruption" of usual type is also harmful because it presents an abutment which gives opportunity for paraffin, precipitated from the oil during its flow up the tubing, to build up to an extent which greatly reduces the flow, and often chokes off the tubing bore to an extent requiring that the string be pulled for cleaning.

In many wells the flow velocity is relatively high and the stream is susceptible of harmful eddying and turbulence. The "interruptions" presented by the usual spaces between joint-parts and opening to the tubing bore, represent turbulence rings which produce a loss of head at every joint in the tubing string, which loss, in the aggregate, is sufficiently large to reduce appreciably the potential of the well.

The eddying and turbulence, caused as above, has other serious effects. For instance, it has very serious erosive effects at or just above each usual "interruption." It is particularly harmful when the well fluid is corrosive in character. It constantly scours the wall of the tubing and exposes "new" metal to erosive and corrosive attack, thus causing a rapid eating away of the tubing wall to an extent which, if it does not lead to ultimate failure, critically weakens the tubing. There are some fluids of corrosive nature which build up a scale on the tubing wall which would normally protect the metal beneath the scale, but the eddying and turbulence set up by the usual "interruption" constantly flushes the scale away and thus constantly exposes "new" metal to attack.

In some cases it has been found of ultimate advantage, even though the cost is much greater, to use tubing made up of corrosive resistant metal. While this disposes of the danger of corrosion, the erosive effect of eddying and turbulence remains as before. On the other hand, tubing of metal which is subject to corrosive action has been interiorly coated with a non-corrodible material. This protects the main bore-wall but, if the usual joint-gaps are present, the pin walls which define the ends of the gaps are exposed to erosive action, and failure results, or fatal results are initiated, at this point.

It is therefore among the objects of the present invention to provide a tubing and tubing joint which will approach as nearly as possible the ideal of a completely "flush", uniform diameter, bore and, to the extent that the bore is not completely "flush" or of uniform diameter, to reduce to a minimum the effects of the "interruption." How this is done may be discussed to better advantage in connection with the following detailed description, reference being made to the accompanying drawings in which:

Fig. 1 is an elevation, partly in section, of a string of tubing embodying my invention;

Fig. 2 is an enlarged, fragmentary sectional view of the pin member of one of the joints shown in Fig. 1;

Fig. 3 is an enlarged, fragmentary sectional view of the box member of one of the joints shown in Fig. 1;

Fig. 4 is a view in which the parts of Figs. 2 and 3 are shown as assembled;

Fig. 5 is a fragmentary section illustrating a special condition which is sometimes encountered;

Figs. 6, 7 and 8 are views similar to Fig. 4, but showing variations in the internal shoulder formation;

Fig. 9 is a view similar to Fig. 4 but showing the invention applied to a joint having a tapered thread;

Fig. 10 is a view similar to Fig. 2 but showing a preferred type of construction;

Fig. 11 is a view similar to Fig. 3 but showing a preferred type of construction;

Fig. 12 is a view in which the parts of Figs 10 and 11 are shown as assembled;

Fig. 13 is a greatly enlarged detail of the internal shoulder arrangement shown in Fig. 12;

Fig. 14 is a view similar to Fig. 12 but showing a coating applied only to the bore-wall of the tubing;

Figs. 15 and 16 are fragmentary showings of variational internal-shoulder features which may be considered as selectively useable in connection with the showing of Fig. 14.

In Fig. 1 a tubing string 10 is made up of pipe sections 11 coupled by joints 12, each joint comprising a pin member 13 on the end of one section and a box member 14 on the opposing end of an adjacent section. The pipe material may or may not be of a corrosion resisting nature and the joint elements may or may not be integral with their associated pipe sections, though the illustrated condition of integrality is preferable.

While this is not at all limitative on the invention, it may be helpful for the purpose of visualizing an actual embodiment, to point out that the invention is illustrated in connection with a tubing string which, at the joint, is about .4375" thick and is about 3.25" outside diameter. However, it is pointed out preliminarily that the spaces between the internal shoulders of the joint are very greatly exaggerated in width in all the figures. Actually, these spaces are never wider than ten one-thousandths of an inch, as will presently appear.

The bores 15 of sections 11, including the portions which extend through the pins and boxes, are as nearly of uniform diameter throughout as is feasible within manufacturing tolerances, and the bores of the sections are as nearly concentric as feasible within those same limits.

In each joint 12, the pin member 13 has an annular square-cut "internal" auxiliary shoulder 16 at its free end, an annular square-cut, "external" sealing shoulder 17 at a point axially spaced from shoulder 16, and a threaded portion 18 on the reduced-diameter portion 19 between said shoulders. The box member 14 is provided with a counterbore 20, at the bottom of which is an annular square-cut "internal" auxiliary shoulder 21. The free end of the box is provided with an annular, square-cut "external" sealing shoulder 22, and the wall of the counterbore is threaded at 23 to take pin-thread 18.

The axial spacing B of box shoulders 21—22 is greater than the axial spacing A of pin shoulders 16—17, it following that when the joint is initially made up as in Fig. 4, at which time external shoulders 17 and 21 are in initial sealing engagement, a narrow annular space 24 opens to the tubing bore 15. As previously stated, the width of this space (measured axially of the pipe) is greatly exaggerated in all the views. The actual width is a very critical factor in the carrying out of the invention, as will appear.

Since the external shoulders 17—22 are to be the sealing shoulders, there must be no interference from internal shoulders 16—21. In order practically to insure this, a definite space 24 must be, and is, provided for. The space for this purpose should be at least one one-thousandth of an inch. But, in the manufacturing practise, feasible plus and minus tolerances must be allowed. The relative spacings A and B must be such that, if, for instance, dimension A is at the plus limit of tolerance and dimension B is at the minus limit of tolerance, the space 24 must still be not less than one one-thousandth of an inch.

On the other hand, the limit of greatest allowable space-width is very critical. The spacing must be kept sufficiently small to insure that, if the joint is exposed to torque overload (as in "drilling-in" or as in operating tools by tubing rotation) the auxiliary shoulders 16—21 will mutually engage in time to prevent destructive or severely harmful deformation of the joint. It must also be sufficiently small to prevent the rubber of a swab from extruding thereinto as the swab traverses the bore. It must also be kept sufficiently small to eliminate the occurrence of the eddy and turbulence effects discussed above. It must be kept sufficiently small that fluid entering thereinto will be in a quiescent state and therefore not erode the peripheral pin-surface 25 which defines the end of space 24, or dislodge the material which, under certain circumstances to be described later, may be used as a filler for the space. Pin surface 25 is especially critical since it is immediately adjacent the first contacting surfaces of the pin and box to be reached by well fluid and, if surface 25 becomes eroded or corroded, there is initiated a leakage channel leading to the sealing surfaces. Once such a channel is started, it enlarges and extends with astonishing rapidity.

I have discovered that a space 24 of a width not greater than ten one-thousandths of an inch will fulfill all the prescribed requirements and therefore all my appended claims are restricted to that outside limit. This allows a perfectly feasible plus or minus tolerance to dimensions A and B. In other words, there must be a definite spacing between internal shoulders 16 and 21 when external shoulders 17—22 are initially in sealing engagement, but that space must not be more than ten one-thousands of an inch if all the benefits enumerated above are to be gained.

Ideally, though not necessarily, space 24 is of a radial extent or "length" at least five times as great as its width—in other words at least five one-hundredths of an inch in radial extent. A width-to-length proportion of 1 to 10 gives superior results. This comparatively great "depth" of the narrow space aids in insuring that the fluid within the space near pin-surface 25 is almost completely quiescent, thus preventing erosion of this otherwise vulnerable area and, in case the fluid is of the scale-creating type, preventing the flushing or scouring away of the scale in a manner constantly exposing "new" metal to corrosive attack.

All the benefits enumerated above may be gained even though the spacing between shoulders 16—21 be not radially uniform. In Figs. 6, 7 and 8 formations are shown where that spacing is not uniform and yet all the mentioned benefits may be gained, though there is a reduction in the ultimate effectiveness of shoulders 16—21 as auxiliary stops—that is, there is less area to take the forces due to torque over-load.

In Fig. 7, shoulders 16a and 21a, spaced apart as defined above, extend from the bore wall only part way across the end of the pin and bottom wall of the box counterbore. Between shoulders 16a and 21a the end of the pin and bottom of the box counterbore are undercut to provide a slightly enlarged, annular pocket 27, but the space 24 forms a restricted mouth for this pocket and, as such, prevents harmfully rapid in-and-out flow of well-fluid.

In the variation of Fig. 6, the shoulders 16b and 21b, are arranged immediately adjacent pin-area 25, while the free end of the pin and the bottom wall of the box counterbore are cut back to provide a wider space 28 which opens to the tubing-bore. At the time the external shoulders 17, 22 are in initial sealing contact, the width of space 28 is no greater than ten one-thousandths of an inch and space 24 is accordingly reduced in width.

In Fig. 8, shoulders 16c and 21c are arranged centrally of the free end of the pin and the bottom wall of the box, said end and wall being cut back to provide an annular pocket 30 and an annular space 31 wider than space 24, and with space 31 opening to the bore of the tubing. The pocket 30 has the characteristics of pocket 27 in Fig. 7, and space 31 has the characteristics of space 28 in Fig. 6 and what has been said of Figs. 7 and 6 in connection therewith is to be considered as applied also to Fig. 8.

In Fig. 5 there is illustrated a condition which sometimes arises due to manufacturing difficulties. Occasionally the bores 15 of adjacent tubing sections are not exactly concentric or vary somewhat in diameter. This causes a radial offset, indicated at 31, between adjacent bore-walls, which has the same effect as a shoulder projecting into the string-bore. Fig. 5, of course, represents this condition in greatly exaggerated form. To offset as far as possible the effect of such a shoulder "interruption," the corners 33 may be slightly rounded off as illustrated, it following that swab rubbers are not apt to be harmed as the corners are passed and the fluid glides over the rounded corners smoothly rather than being put into a turbulent condition.

In Fig. 9 is shown a joint having all the characteristics of the joint illustrated in Fig. 4 except that the pin 13a, the box 14a and threads 18a, 19a are tapered, with conical faces 35—36 provided at opposite ends of the threads. All that has been said of Fig. 4 applies to Fig. 9.

Figs. 10 to 16 illustrate preferred forms of the invention wherein pin 31d is provided at the upset end 37 of section 11a, and box 14d is provided at the upset end 38 of section 11b. The bores 39 of the upsets are of very slightly less diameter than are the main bores 15, but they merge so smoothly and have such slight differential in diameter that the zones of junction present no significant "interruptions."

External sealing shoulders 17d and 22d are complementarily tapered and telescopically arranged to offset the tendency of the upper end of the box to expand or spread under torque load as transformed to longitudinal compression by reason of the threaded connection.

Referring first to Figs. 10 to 13, internal shoulders 16d and 21d are square-cut, and the relationship of dimensions A and B is the same as described in connection with Figs. 2 and 3, it resulting that when the external shoulders 17d–22d are initially sealingly engaged, there is left an annular space 24d between internal shoulders 16d and 21d, which space is not greater than ten one-thousandths of an inch. Thus everything that has been previously said regarding the sequential sealing of external and internal shoulders and the advantages flowing from the minuteness of the width of the space between internal shoulders, applies to the showing of Figs. 10 through 14.

The threaded connection between box and pin is of the two-step type, with all its well known inherent advantages of stabbing ease, preservation of maximum stock-thickness throughout its longitudinal extent, etc. The upper and larger-diameter threaded step 40 of pin 13d mates with threaded step 41 of box 14a; while the smaller-diameter threaded pin-step 42 mates with threaded box-step 43. Intermediate the pin steps 40, 42 is an annular shoulder 44 which opposes annular shoulder 45, the latter shoulder being located in the box at a point intermediate box steps 41, 43. The dimension D is greater than dimension C so, when external shoulders 17d, 22d are initially in sealing engagement, shoulders 44 and 45 are spaced apart at 46. Ideally, spaces 24d and 46 are of the same width, so in the event the joint is exposed to torque overload, shoulder-pairs 16d—21d and 44—45 seat approximately simultaneously, the shoulder-pairs thus having additive effect in resisting further telescoping of the joint.

The nose 48 of pin 13d is externally tapered, as at 49, and the counterbore of box 14d is complementarily tapered at 50, and these tapered surfaces engage just prior to the engagement of sealing shoulders 17d, 22d to form an internal seal. The metal of the box and pin will be slightly displaced in the nose-zone if the joint is finally made up under torque overload, to an extent greater than that shown in Fig. 12 and, as a matter of fact, it is slightly displaced in reaching the position of Fig. 12.

The internal shoulders 16d and 21d may, of course, be modified to agree with the showing of Figs. 6, 7 or 8. Fig. 13, which is drawn on a scale much over full size, illustrates the proportions of a space 24d which has a radial extent of about ten times the width of the space. It will be seen that with a long narrow space (and remembering that the actual width of the space is not greater than ten one-thousandths of an inch) the space forms a restricted mouth leading to pocket 53, which prevents harmfully rapid in-and-out flow, all to the advantageous ends spoken of above.

When the well fluid is relatively mildly corrosive and is of a nature to build up a protective scale, the joint may be "proofed" against continuing corrosive action by bonding a non-corrodible and relatively rigid material 54 (Fig. 14) to the bore wall of the pipe section and joint. The thickness of the coating is greatly exaggerated in Fig. 14 (as well as in Figs. 15 and 16 which are later to be described), for actually it usually need be only a few one-thousandths of an inch thick. Any suitable non-corrodible coating may be used, such as a metallic plating, a baked-on non-corrodible plastic, or a non-oil-soluble paint.

With this bonded coating protecting the bore wall, the extreme narrowness of space 24d prevents destructive eddying and scale-flushing within that space and thus protects the surfaces of shoulders 16d and 21d, as well as pin area 25d from continuing corrosive or erosive effects.

When the corrosive action of the fluid is more pronounced or is such that a protective scale is not built up, it is a feature of my invention to fill space 24d with any suitable non-rigid, non-corrodible material 55 (Fig. 15) such as a body of plastic or paint or a washer of lead or oil-resistant rubber. The term "non-corrodible," as used in the claims, is to be considered as including the characteristic of non-oil-solubility. Filler 55 extends from coating 54 to surface 25d, thus covering with a protective coating every portion of metal to which the corrosive fluid would otherwise find access. Particularly, it protects the otherwise especially vulnerable pin area 25d.

The filler, being non-rigid and being displaceable into the joint-bore under endwise pressure from the joint-parts, does not prevent the full seating of the external shoulders during the initial make-up of the joint. On the other hand, the specified narrowness of space 24d practically eliminates the danger of the filling material, if it is the nature of a semi-liquid, from being washed out by the fluid flow through the bore. The relatively great radial extent or depth of the filler within space 24d and the keying effect of such material in pocket 53, aids in resisting its displacement by fluid flow through the string-bore.

In certain situations, where the corrosive action of the well fluid is relatively severe, it is a feature of my invention to carry the bonded coating across shoulders 16d and 21d, as at 56 and 57 in Fig. 16. In this case, the spacing between the shoulder coatings 56 and 57 is the critical factor. Accordingly, the metal of the pin and box is originally machined to accommodate a shoulder-coating of given thickness and yet create, between the opposed faces of those shoulder coatings, a space 24d which is no greater than ten one-thousandths of an inch when external shoulders 17d, 22d initially sealingly engage. Then, to protect pin area 25d, a non-corrodible, non-rigid filler 58, such as described in connection with Fig. 15, is provided within space 24d. Again the nature of space 24d and the keying effect of the material within pocket 53 effectively resists displacement of the filler by the flow-action of the well fluid.

Of course, the coatings and fillings described in connection with Figs. 14 to 16 may, if desirable or necessary, be applied to the types of joints illustrated in the other figures.

While I have shown and described preferred embodiments of my invention, it will be understood that various changes in design may be made without departing from the spirit and scope of the appended claims.

I claim:

1. A tubing joint embodying mating, tubular pin and box members, an annular internal shoulder at the free end of the pin member and an annular external shoulder on the pin member and axially spaced from said internal shoulder, the box member having a counterbore receiving the pin member, an annular internal shoulder on the box member, the last named shoulder being within the counterbore and facing toward the free end of the box member, an external annular shoulder at the free end of the box member, mating threads on the box and pin members between the internal and external shoulders, the external and internal shoulders of one member facing the external and internal shoulders respectively, of the other member, the axial spacing between the shoulders of one member with respect to the axial spacing between the shoulders of the other member being such that, when the external shoulders first engage one another, the internal shoulders of the two members are spaced apart by not more than ten one-thousandths of an inch.

2. A tubing joint embodying mating, tubular pin and box members, an annular internal shoulder at the free end of the pin member and an annular external shoulder on the pin member and axially spaced from said internal shoulder, the box member having a counterbore receiving the pin member, an annular internal shoulder on the box member, the last named shoulder being within the counterbore and facing toward the free end of the box member, an external annular shoulder at the free end of the box member, mating threads on the box and pin members between the internal and external shoulders, the external and internal shoulders of one member facing the external and internal shoulders, respectively, of the other member, the axial spacing between the shoulders of the other member being such that, when the external shoulders first engage one another, the internal shoulders of the two members are spaced apart by not more than ten one-thousandths of an inch, and a non-corrodible, non-rigid filler in the space between the internal shoulders.

3. In a tubing joint embodying threadably connected, tubular pin and box members, an annular internal shoulder at the free end of the pin member, an annular seating shoulder on the pin member and axially spaced from said internal shoulder, the box member having a counterbore receiving the pin member, an internal annular shoulder on the box member, the last named shoulder being within the counterbore and facing toward the open end of the box member, an annular seating shoulder on the box member and axially spaced from the internal shoulder of the box member, the internal and seating shoulders of one member facing the internal and seating shoulders, respectively, of the other member, a coating of non-corrodible material bonded to the bore walls and the internal shoulders of the two members, the axial spacing between the shoulders of one member with respect to the axial spacing between the shoulders of the other member being such that, when the seating shoulders first engage one another, the coatings on the internal shoulders of the two members are spaced apart by not more than ten one-thousandths of an inch.

MELVIN D. MacARTHUR.

REFERENCES CITED

The following references are of record in the file of this patent:

UNITED STATES PATENTS

| Number | Name | Date |
|---|---|---|
| 122,131 | Platt | Dec. 26, 1871 |
| 1,562,372 | Sheldon | Nov. 17, 1925 |
| 1,889,872 | Montgomery | Dec. 6, 1932 |
| 1,927,656 | Eaton et al. | Sept. 19, 1933 |
| 2,087,185 | Dillon | July 13, 1937 |
| 2,091,906 | Bettis | Aug. 31, 1937 |